Fig. 1.

Patented June 23, 1936

2,045,232

UNITED STATES PATENT OFFICE 2,045,232

VALVE CONTROL MECHANISM

Phillip A. Kinzie, Denver, Colo., assignor to Universal Hydraulic Corporation, Denver, Colo., a corporation of Colorado Application February 8, 1930, Serial No. 426,872
Renewed May 15, 1935

33 Claims. (Cl. 137—139)

This invention relates to mechanism for controlling the operation of valves of the type in which a valve element, commonly known as a needle, is caused to move toward and away from its seat, or to assume any control position relatively thereto, by the influence upon it of differential pressures. As disclosing examples of such valves, attention is directed to the copending applications of Leslie N. McClellan, Philip A. Kinzie, John L. Savage and Charles M. Day, filed January 31, 1928, Ser. No. 250,778, and filed January 18, 1929, Ser. No. 333,459.

In valves of this character wherein a plurality of chambers furnishing differential pressure areas is provided, it is essential that the pressure fluid, usually water from the body or stream of water controlled, be so admitted to and exhausted from the several chambers, as required, that the full effect of the differential pressure areas may be obtained and reflected in the movements, whether great or small, of the valve member.

The main object of this invention is, therefore, to provide control mechanism whereby the effect of the pressure fluid within the pressure chambers of the valve and upon the differential pressure areas thereof may be so controlled as to obtain the maximum operating efficiency of the valve.

To this end the invention contemplates the combination with a valve proper having a plurality of pressure chambers providing differential pressure areas, of control mechanism including a control valve, passages communicating therewith and with the pressure chambers and controlled by the control valve, and operating mechanism responsive to movement of a movable member of the valve proper and to manually operable means for its adjustment, whereby the control of said passages by said control valve may be accomplished, as I will proceed now to explain and finally claim.

In the accompanying drawings illustrating the invention, in the several figures of which like parts are similarly designated.

Figure 1:
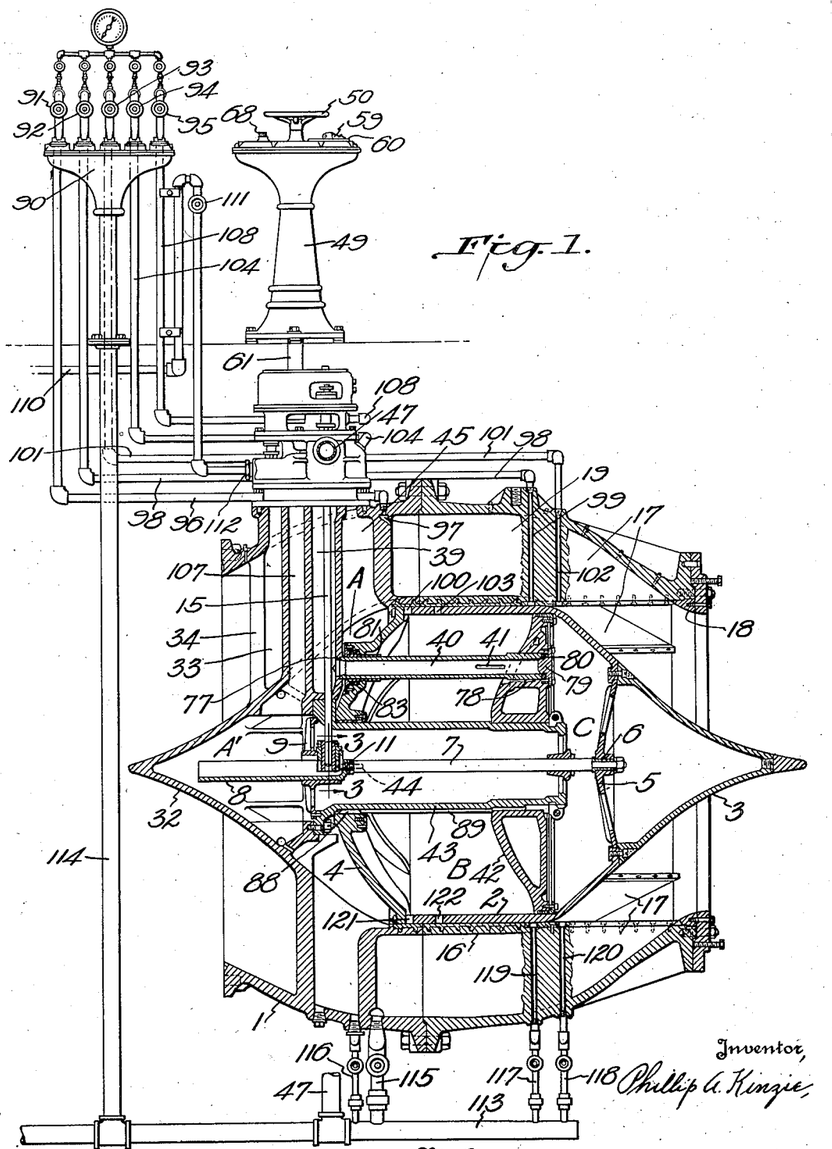
Figure 1 is a sectional elevation of a valve proper of the type hereinbefore referred to and the control mechanism therefor, the latter being shown in elevation.
Figure 3:
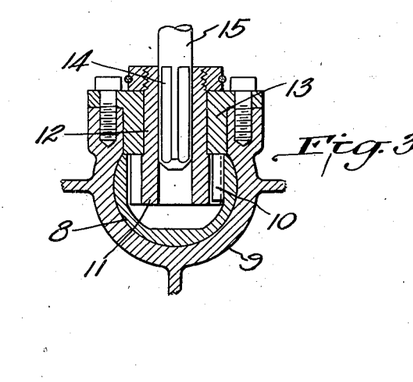
Figure 3 is an enlarged section taken on line 3—3 of Fig. 1.

Referring particularly to Fig. 1 of the drawings, it will be seen that the valve proper is of the movable needle or plunger type, and comprises essentially a casing 1 and a movable needle or plunger having a body 2, nose 3 and head 4. The forward portion of the body 2 is tapered to frusto-conical shape, and carries a spider 5 held in place by the nose 3. This spider is provided with a hub 6 having a bearing in which is mounted one end of a shaft 7 to the other end of which is attached a cylindrical member 8 in sliding engagement within a fixed bearing member 9. The cylindrical member 8 is interiorly recessed troughout its length, and provided with rack teeth 10 (Fig. 3) in constant mesh with a pinion 11 having a shank 12 carried by and supported in a bearing 13 provided in the member 9.

The shank 12 is broached to receive the squared end 14 of a shaft 15 to which rotative movement is imparted by the rack-and-pinion gearing 10—11. This shaft 15 extends to the valve control mechanism and provides an actuating means therefor, as will be hereinafter more fully explained.

As is the case in the valves disclosed in the copending applications referred to, the valve member or needle is mounted for axial sliding movement in the casing 1 within a cylindrical guide member or housing 16 supported axially of the casing 1 by means of radial vanes or ribs 17 and preferably integral therewith. Thus the needle may move toward and away from a seat 18 formed in the casing 1, and will control the flow of fluid through the annular space 19 defined by the casing 1 and guide member 16 and hence determine the valve opening.

Obviously, as the needle moves it carries with it the shaft 7 and member 8 and through the medium of the rack-and-pinion gearing 10—11 will impart rotation to the shaft 15. Thus, when the needle recedes from its seat 18, to open the valve, the shaft 15 will be given a clockwise rotative movement (considered as viewed from above) and when the needle moves toward its seat 18, the shaft 15 will be rotated counter-clockwise.

Figure 5:
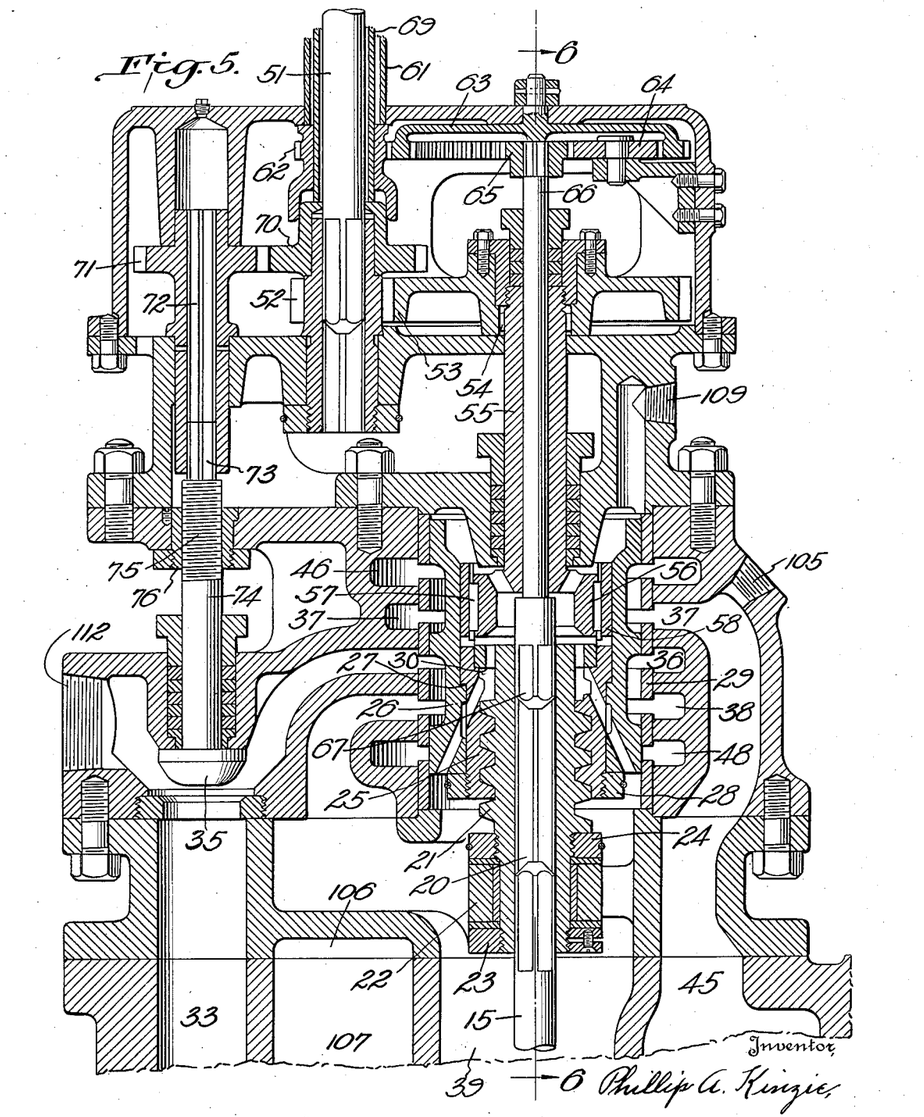
Fig. 5 is an enlarged sectional elevation of the control valve of the control mechanism taken on line 5—5 of Fig. 6
Figure 6:
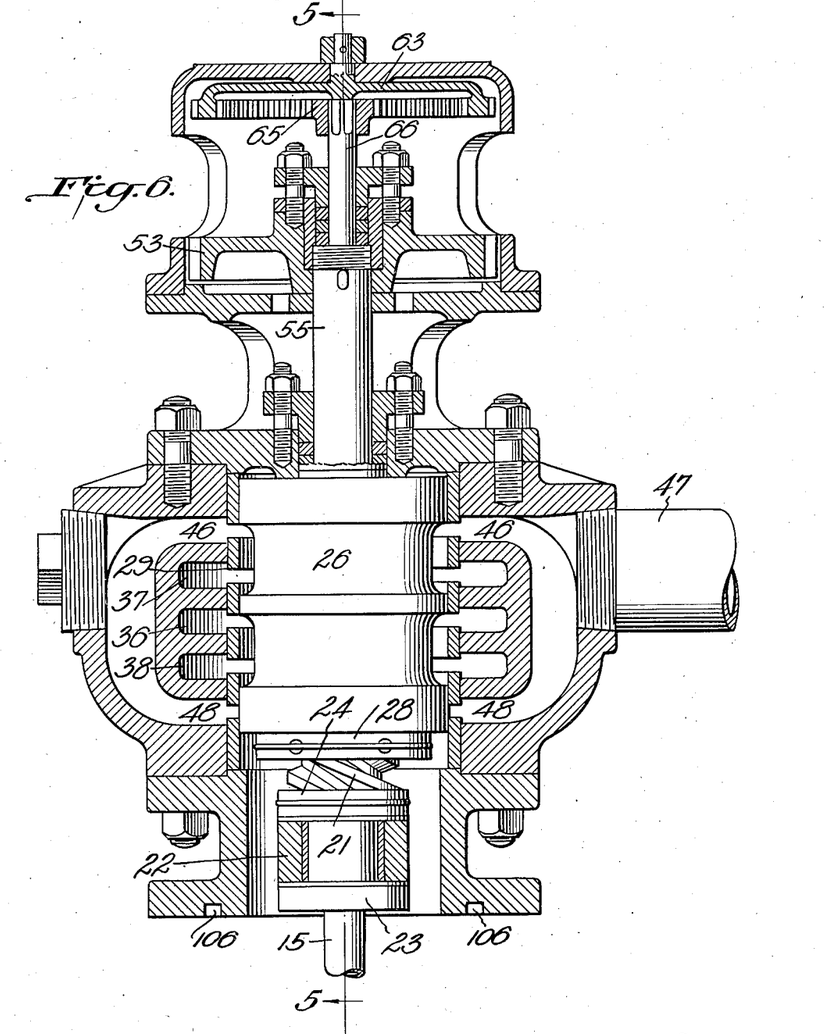
Fig. 6 is a similar sectional elevation taken on line 6—6 of Fig. 5.

Referring now to Figs. 5 and 6, wherein the details of the control mechanism are shown, it will be seen that the upper end of shaft 15 is squared, similarly to its lower end, and is engaged with the broached bore 20 of a worm member 21. Hence, the worm member 21 will be rotated by the rack-and-pinion gearing 10—11 through the medium of shaft 15 in response to movement of the needle of the valve proper.

The worm member 21 is rotatably mounted and held against axial movement in a fixed bearing member 22 by means of stop collars 23 and 24.

The thread of the worm member 21 is preferably triple pitch and meshes with a nut 25 rotatably mounted in a shiftable valve element in the form of a spool or piston 26 which it frictionally engages and to which it imparts axial movement by means of a shoulder 27 and lock collar 28. Thus rotation of the shaft 15 and with it of worm 21 will cause the nut 25 and with it spool or piston 26 to travel axially of a ported liner 29 between the limits prescribed by collar 24 and the upper shoulder 30 of the worm member 21 which forms a stop collar at the top of the worm member. Any excess rotation of worm 21 will serve to rotate nut 25 within the spool or piston 26.

Therefore, although the rack-and-pinion gearing 10—11 is capable of imparting to the worm 21 rotation which would result in relatively great axial movement of the nut 25 and spool or piston 26, such axial movement is limited, as described, and the multiple pitch of the worm which results in rapid movement of the spool or piston will make the spool or piston very sensitive to rotation of the shaft 15 and therefore to slight movement of the valve needle.

As distinguished from the valve proper, the valve formed by the spool or piston 26 and ported liner 29 is referred to as a control valve.

Figure 2:
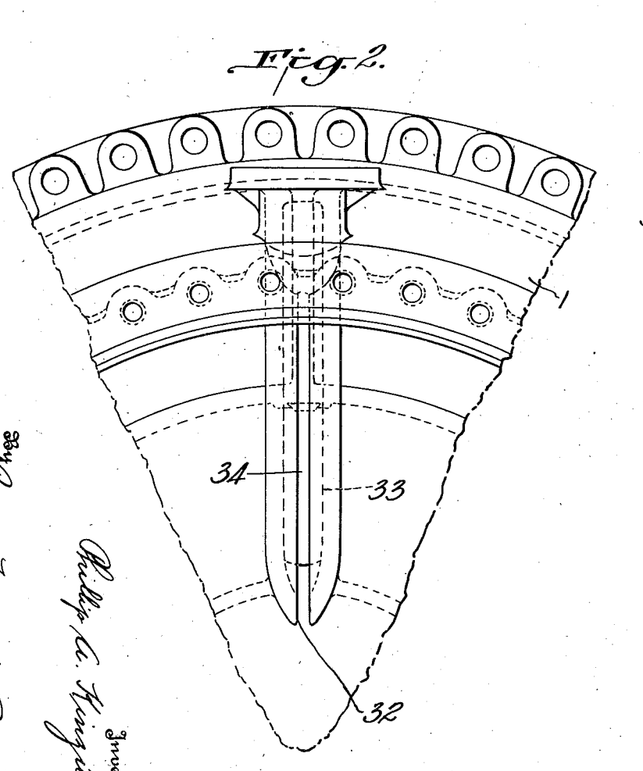
Fig. 2 is an enlarged fragmentary end elevation of the casing of the valve proper, showing the inlet opening of one of the passages for the pressure fluid.

The pressure fluid for actuating the valve (water from the body or stream controlled) is collected from the fluid entering the casing 1 at the up-stream end around the splitter 32 and enters a pasageway 33, leading to the control body, through a relatively long slot 34 (see Figs. 1 and 2). By causing the pressure fluid to thus enter the control body, I maintain an appreciable percentage of the velocity head of the rapidly-flowing fluid. The pressure fluid thus entering the passageway 33 is conducted into the control body past a speed control valve 35. Thence the fluid passes into and annular passage 36 surrounding the control valve 26—29 and its constant pressure in such passage makes it immediately available to annular port 37 or 38 depending upon the position of the spool or piston 26.

In Fig. 1 the needle of the valve proper is shown in the wide open position, and in Figs. 5 and 6, the position of the spool or piston 26 of the control valve is shown in the adjustment to maintain this wide open position of the needle. In this adjustment the spool or piston 26 opens communication between the passage 36 and port 38, and the pressure fluid flows into passageway 39 through which it passes into the communication tube 40 and thence through a slotted port or ports 41 of the tube into the chamber B defined by a diaphragm 42 carried by an axial tube 43 fixed to the casing 1, and the head 4 of the needle, in which chamber pressure tending to move and hold the needle in the open position is established. At the same time that this pressure is building up in chamber B the pressure fluid contained in chamber C will be expelled through axial tube 43 into chamber A through ports 44 in tube 43, one of which ports is shown in dotted lines in Fig. 1, whence it flows upward through passage 45 into annular port 37 of the control valve and is directed thence by the spool or piston 26 into passageway 46 from which it escapes through waste pipe 47 (see Figs. 1 and 6).

Evidently, therefore, as long as the spool or piston 26 is kept in the position shown, pressure will be maintained in chamber B, and fluid which leaks into chambers A and C, through the clearance spaces necessary for proper operation of the needle, will be permitted to escape from these chambers. Thus, by introducing pressure fluid into chamber B and releasing fluid from chambers A and C the full power effect of the fluid in chamber B is attained to exert an opening influence upon the needle no matter what its position with relation to its seat 18 may be.

Conversely, if the spool or piston 26 is moved to its lowest position, the power fluid will flow into chambers A and C through ports and passages 36, 37 and 45 and will be free to escape from chamber B through ports and passages 41, 40, 39, 38, and 48 to waste pipe 47. Thus, as long as the spool or piston 26 is in the lowered position, pressure tending to close the needle against its seat 18 will be maintained in chambers A and C and fluid will be free to escape from chamber B.

As already indicated, opening movement of the needle causes clockwise rotation of shaft 15, and closing movement of the needle causes counter-clockwise rotation of shaft 15. Thus, the thread of the worm 21 being a left-hand thread, opening movement of the needle will cause the spool or piston 26 to move downward, and closing movement of the needle will cause the spool or piston to move upward.

It will therefore be seen that the movement of the needle is reflected in movement of the spool or piston of the control valve and vice versa, and that these two members are functionally interdependent.

Thus, if manually operable means are provided for adjusting the position of the spool or piston 26, a concomitant movement of the needle due to pressure variations in the chambers A, B and C will be produced.

It is thus apparent that four fundamental facts governing the action of the control mechanism and needle are presented, viz:

1. Upward movement of spool or piston 26 results in opening movement of the needle.
2. Downward movement of spool or piston 26 results in closing movement of the needle.
3. Opening movement of the needle causes downward movement of the spool or piston 26, and,
4. Closing movement of the needle causes upward movement of the spool or piston 26.

In order that the control valve 26—29 may be manually operated, I provide a control stand 49 (Fig. 1) having a hand-wheel 50 carried by a shaft 51 which extends downwardly into the control body and is fitted adjacent to its lower end with a pinion 52 (Fig. 5) which meshes with a gear 53.

The gear 53 is keyed at 54 to a tubular shaft 55 provided at its lower end with a head 56 keyed at 57 to an extension 58 of the nut 25. By this arrangement, if the hand-wheel 50 is turned clockwise, the shaft 51 and pinion 52 will be similarly turned and will impart counter-clockwise rotation to nut 25 through shaft 55 and gear 53. This counter-clockwise rotation of nut 25 causes it to descend the worm member 21, carrying with it the spool or piston 26 until the latter reaches its limit of downward movement.

In this position the control valve 26—29 will admit pressure fluid to chambers A and C and permit escape of fluid from chamber B. Consequently, the needle will start its closing movement and this movement will, through the rack-and-pinion gearing 10—11, produce counter-clockwise rotation of shaft 15 and worm member 21 and cause the nut 25 and spool or piston 26 to move upward. If this movement is permitted to continue it will quickly throttle communication between ports and passages 38, 48 and 37, 36 until a balance of pressure is established within the chambers A and C and chamber B, thereby bringing the needle to rest in a new position nearer to seat 18 than that formerly occupied by it. In view of the fact that as the hand-wheel 50 is rotated clockwise to move the spool or piston 26 downward and is rotated counter-clockwise to move the same upward the effect of the pressure fluid in the chambers of the valve proper tends, through the rack-and-pinion gearing, to counteract such movement and bring about a balance of pressures in the chambers and a consequent position of rest of the spool or piston and of the valve needle, it will be seen that in order to impart full closing or opening movement to the valve, continued clockwise and counter-clockwise rotation, respectively, of the hand-wheel 50 must be made until the needle has seated or fully opened, the spool or piston 26 being held in one or the other of its extreme positions.

The position of the valve needle relatively to its seat is indicated at all times at the control stand 49 by a pointer 59 (Fig. 1) which travels through an arc of approximately 262° over the scale of a dial 60. This pointer is appropriately driven by gearing (not shown) in the control stand through a tubular shaft 61 (Fig. 5) having a pinion 62 which meshes with the external teeth of an external-internal gear 63, the internal teeth of which mesh with an idler 64 driven by a pinion 65 carried by a shaft 66 having a squared end 67 in driven engagement with the broached bore 20 of worm member 21. The worm member 21 being directly connected with and responsive to movement of the needle will cause the train of mechanism just described to reflect such movement in the pointer 59.

In order that the speed control valve 35 may be adjusted to increase or decrease the speed of movement of the needle of the valve by increasing or decreasing the rate of flow of the pressure fluid, I provide at the control stand 49 a shaft 68 having an outwardly extending squared or other-shaped end to receive a wrench or handle (not shown). This shaft is connected by suitable gearing (not shown) within the control stand with a tubular shaft 69 (Fig. 5) provided at its lower end with a gear 70 rotatably journalled upon the hub of pinion 52. The gear 70 meshes with a gear 71 having a broached bearing spindle 72 in driving engagement with the squared end 73 of the stem 74 of the valve 35. The stem 74 is threaded, as shown at 75, and cooperates with a fixed complementally threaded bushing 76. By this arrangement it will be seen that rotation of the shaft 68 will impart opening and closing movement of the valve 35.

In needle valves of the internal differential type, such as that shown in Fig. 1, the introduction into and removal of the pressure actuating fluid from the central chamber B presents problems of design and construction difficult to overcome. By providing the communication tube 40, I have solved these problems and produced a valve of this type which may be constructed and operated with marked facility and ease.

Figure 4:
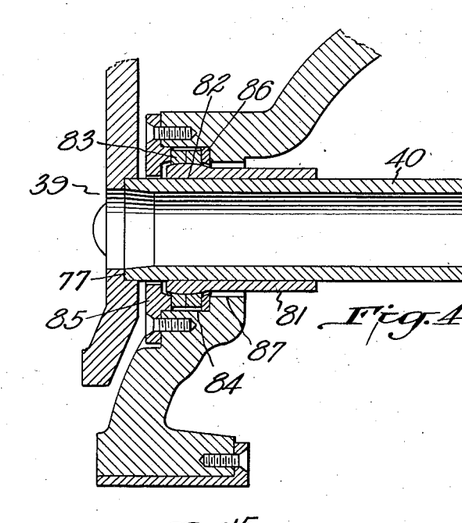
Fig. 4 is an enlarged detail section of the bearing of the communication tube.

The tube 40 is arranged with one end (the up-stream end) in a counterbore 77 in the casing 1 (see Figs. 1 and 4) and in direct communication with the passageway 39, and its other end fits within a bore 78 in fixed diaphragm 42 and is held in place and closed by a cap 79 and resilient washer 80, whereby the tube end is made watertight and inaccuracies of fit compensated for. Where the tube passes through the head 4 of the needle I provide a flexible sliding and floating bearing. This bearing (Fig. 4) includes a sleeve 81 having a spherical surface 82 at one end which is engaged by a complemental split bearing ring 83 mounted in a counterbore 84 in the head 4 and held in place between an apertured cap 85 and ring 86. As will be seen, the diameters of the bearing member 81 and split ring 83 are less than that of the opening 87 and counterbore 84 in head 4 in which they are arranged, and hence a certain amount of play between the tube 40 and head 4 is provided for, but due to the fit of the ring 83 fluid is prevented from passing around the bearing from chamber B to chamber A and vice versa. Moreover, the lateral and axial flexibility of this mounting negatives any tendency of the bearing 81 to bind upon tube 40.

Obviously, with the tube 40 substantially rigidly held between the fixed parts 1 and 42 and passing through the movable head 4 of the needle, it is necessary to provide some means for preventing rotation of the needle about its axis. This is done by providing the head 4 with a key 88 (Fig. 1) which travels axially in a keyway 89 in the axial tube 43.

The port or ports 41 are so located axially of tube 40 that they will be throttled by bearing 81 near the end of closing movement of the needle to prevent slamming of the needle against its seat. Similarly, the port or ports 44 will be throttled by the hub of head 4 to prevent slamming of the needle in open position.

In valves of the character in question, it is essential for their safe and proper operation that all cavities be free of entrapped air and, therefore, I provide means in connection with my control mechanism whereby this may be accomplished.

Referring to Fig. 1, it will be seen that I provide a vent stand 90 provided with five hand-operated valves 91, 92, 93, 94 and 95. These valves are opened wide when the valve proper is put in service and are closed after the entrapped air has been expelled.

The valve 91 is connected by pipe 96 with a cored passage 97 in the valve casing 1, thus affording a vent for air within the annular space 19 and the conduit (not shown) in which the valve proper is installed.

The valve 92 is connected by pipe 98 with a passage 99 formed in one of the vanes 17 and which registers when the needle is in the closed position, with a port 100 in the body 2 of the needle, thus venting the chamber B above tube 40.

The valve 93 is connected by pipe 101 with a passage 102, similar to passage 99, which registers, when the needle is in closed position, with a port 103 in the needle body 2, thus venting chamber C.

The valve 94 is connected by pipe 104 with the outlet 105 of the control body (see Fig. 5) which, being in direct communication with passageway 45, vents the chamber A, and being in communication through grooves 106 (Figs. 5 and 6) with passageway 107 vents chamber A'.

The valve 95 is connected by pipe 108 with the control body at 109 (Fig. 5) and is thus in communication through passageway 39 with tube 40 and vents chamber B to the elevation of the tube.

It will be apparent that the air vents furnished by vent valves 91, 94 and 95, function properly no matter what the position of the needle may be, whereas the vents furnished by vent valves 92 and 93 function only when the needle is in the closed position.

When the valve proper is put in service, either when first installed or when its functioning is first required, for example at the beginning of the irrigation season when it is used in connection with an irrigation system, it is desirable to first introduce pressure fluid (the water controlled) into chambers A and C. This is done in order to hold the needle to its seat 18 while air is expelled from the interior cavities and chambers of the valve. To do this, a separate pipe line 110 controlled by a valve 111 is run from a source of pressure fluid, such as an upstream penstock, to the control body into which it discharges at 112. In filling chambers A and C from this source, speed control valve 35 is closed and valve 111 is opened and handwheel 50 is turned clockwise to the limit of its travel, thereby moving the spool or piston 26 to the position which establishes communication between passage 36 and passage 45, the depressed position, and admitting the pressure fluid to chambers A and C.

As the fluid enters these chambers the air will be expelled therefrom through vent valves 93 and 94.

Thereafter, when pressure fluid is admitted to chamber B, the air therein may be expelled through vent valves 92 and 95.

In order that water may be drained from all cavities of the valve, to prevent freezing or for other purposes, I provide a drain header pipe 113 to which waste water from the control body and vent stand is conducted by the pipes 47 and 114 respectively, and from the casing by valve-controlled pipe 115.

Chambers A and A' drain into pipe 113 through valved connection 116 and chambers B and C drain into pipe 113 through valved connections 117 and 118, respectively, communicating with passages 119 and 120 which, when the needle is in closed position register with ports 121 and 122, respectively, in the needle body 2.

In the embodiment of the invention as shown in Figs. 1 to 6 inclusive, the control mechanism including the control valve is located above the valve proper, but, if desired, it may be placed beneath the valve proper as illustrated in the alternative construction of Figs. 7 to 13. When so positioned needle valves of poly-chambered construction may be made more effective when the elevation of the surface of the controlled liquid is but a relatively short distance above the center line of the needle valve, as occurs when the contents of a storage reservoir is depleted by heavy power or irrigation demands and the liberating mechanisms (needle valves) are required to function with the least possible required operating head in order that the remaining water may be released for use as needed and the liberating mechanisms still respond to their controls.

By placing the control mechanism, particularly the control valve, beneath the valve proper, the outflow or exhaust of fluid from those chambers of the valve proper in which it is desired that no back pressure shall exist, is carried away from such chambers directly downward into the drain line, thereby relieving those chambers of pressure equivalent to that which would be produced by a column of liquid the height of which is equal to the difference between the vertical distance from the waste pipe of the control when placed above the valve proper and the waste pipe orifice of the control when placed beneath the valve proper.

This difference in elevation for a sixty inch needle valve is approximately ten feet, and is equivalent to a little over 4¼ pounds per square inch of hydrostatic pressure. From this it will be seen that by placing the control valve beneath the valve proper, the back pressure within the inactive chambers of the valve proper will be decreased by more than 4¼ pounds per square inch, thereby increasing the effective pressure within the chambers for imparting movement to the needle by a like amount and consequently making possible the movement and control of the needle with the surface of the controlled liquid at less elevation above the center line of the valve proper than is possible when the control valve is above the valve proper.

Several other advantages are secured by placing the control valve beneath the valve proper, among which the more salient ones are as follows:

1. Simplification of the controlling mechanism.
2. Simplification of the needle valve, permitting of a design which is fabricated with greater facility and is consequently less costly to produce.
3. Drainage of the interior valve cavities is more certain and is made easier of accomplishment.
4. Introduction of the pressure fluid into the actuating chambers is more direct and such fluid can be supplied in greater volume.
5. Admitting the pressure fluid from the lowest part of the valve prevents the entrainment of air within the fluid and allows the entering fluid to drive out the air above its rising level through the vent pipes above.

Figure 7:
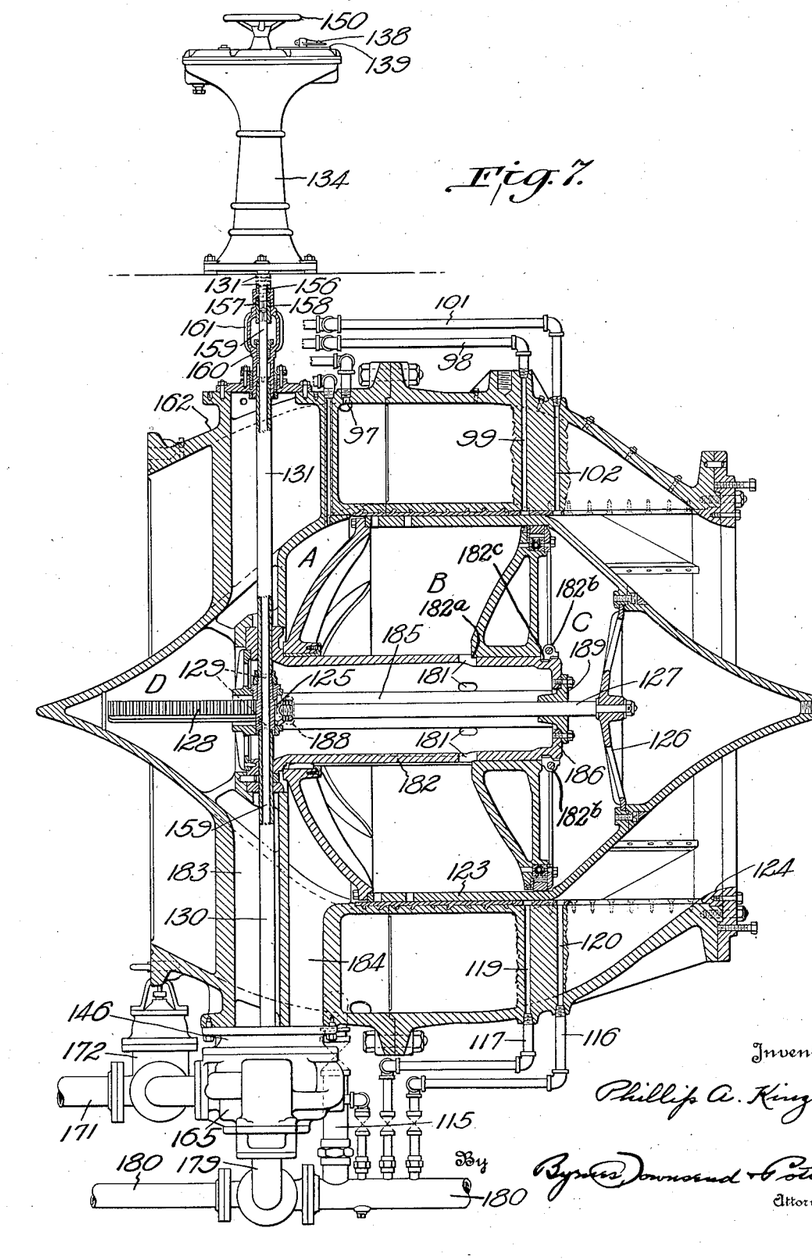
Fig. 7 is a view similar to Fig. 1, but illustrating a modified form of the invention in which the control valve is arranged beneath the valve proper rather than above it as in Fig. 1.

Referring particularly to Fig. 7, it will be seen that the needle valve is of the same general construction as that shown in Fig. 1 already described, and that the means whereby the needle 123 in moving toward and away from its seat 124 produces rotary movement of the rack pinion 125 through the spider 126, the shaft 127 and the rack 128 and the means for maintaining these parts in their proper relative positions are also similar.

The rack pinion 125 has jaw clutches 129 formed in its upper and lower ends, with which the complementally formed ends of two tubular drive stems 130 and 131 are engaged. The tubular shaft 130 extends downward to the control mechanism located beneath the valve, where the jaw clutch 132 (Fig. 12) formed upon its lower extremity engages with the mating jaw clutch formed in the upper end of a control screw 133 so that through this stem 130 any rotative movement of rack pinion 125 caused by movement of rack 128 in response to movement of the valve needle 123 is transmitted to control screw 133, and at the same time this same rotary movement is also transmitted upward by the upper drive stem 131 to the control stand 134 (Figs. 7 and 8) and through the gears 135, 136 and 137 contained within this stand actuates the indicator pointer 138 which registers upon the dial 139 the position of the valve needle 123 with reference to its seat 124.

Referring now to the general assembly of the control mechanism (Figs. 12 and 13), it will be seen that the rotative movement of control screw 133 produced by axial movement of the valve needle 123 by means of the rack 128, pinion 125 and stem 130, as described, will cause upward and downward movement of the control nut 140 and the shiftable valve element or control piston or spool 141 in the same manner as that already described with reference to the equivalent parts of the control mounted above the valve proper, and that this upward movement of the parts 140 and 141 is limited by the upper face of piston collar 142 coming in contact with the lower face of lower screw collar 143, and that downward movement of these parts 140 and 141 is limited by the counterbored shoulder 144 of nut 140 coming into contact with the upper face of the collar 145 formed as an integral part of the lower end of screw 133, so that the vertical travel possible for the control piston is limited and any continued rotary movement of screw 133 is converted into rotary motion of the nut 140 and piston or spool 141. It will be noted that control screw 133 is rotatably mounted in control base 146 but is restrained from any axial movement either up or down by the upper screw collar 147 and lower screw collar 143 bearing against screw thrust washers 148 carried at the top and bottom faces of the bearing hub 149 of the control base 146.

Figures 8, 10, 11:
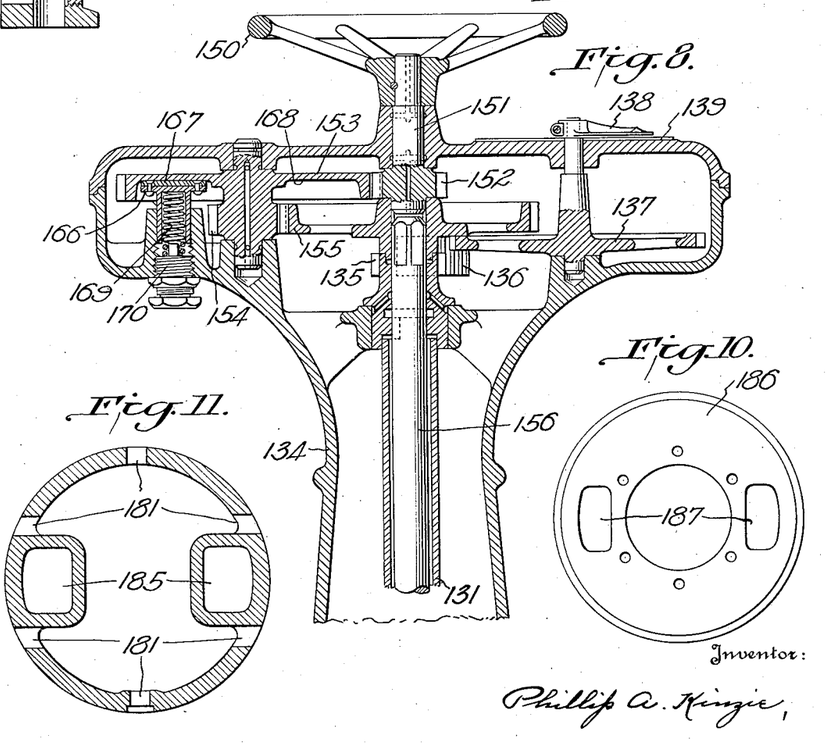
Fig. 8 is an enlarged fragmentary sectional elevation of the control stand of Fig. 7, with its enclosed operative elements.
Fig. 10 is an elevation of the right hand end of this tube.
Fig. 11 is a transverse section thereof on the line 11—11 of Fig. 9.

Manual adjustment of the control mechanism is accomplished by rotation of the control wheel 150 (Figs. 7 and 8). This wheel is mounted upon the shaft extension 151 of control pinion 152 and keyed thereto, and thus when wheel 150 is rotated its movement will be imparted through pinion 152 to a brake gear 153, and the rotation of this gear is transmitted through the teeth of a pinion 154 which is preferably integral with brake gear 153, to control gear 155 whose hub is broached out square and receives the correspondingly squared upper end of a control shaft 156 which extends downward through the stand 134 with its lower squared end 157 (Fig. 7) entering the square broached coupling 158 and imparts the received rotary motion to control shaft 159 which is also connected with coupling 158. Control shaft 159 extends downward through gland 160, coupling 161, tubular drive stems 130 and 131 and control rack pinion 125 through the needle valve body 162, and the lower portion of this shaft 159 passes through control screw 133 and terminates in a squared end 163 (Fig. 12) which is fitted into a similarly broached stem disk 164 keyed to nut 140 which thereby receives the transmitted rotary movement of shaft 159. This rotary movement of nut 140 will cause it to climb up and down the threads of screw 133, and as it moves up or down in accordance to the direction of its rotation will cause the piston 141 to move upward or downward, and thereby close and open the pressure liquid inlet and exhaust ports in control body 165 to the interior actuating chambers of the needle valve in a manner similar to that already described for the control mounted above the valve proper.

To prevent any tendency for the desired axial or up and down movement of control nut 140 and control piston 141 caused by axial movement of the needle, from being nullified or prematurely converted into rotary movement due to the steepness of the helix angle of the threads of control screw 133 and the consequent inclination of control nut 140 to rotate with the screw, the stem disk 164, shaft 159, and the train of gearing 155, 154, 153, and hand-wheel 150, in the control stand 134, are provided with an adjustable friction brake so that the desired axial movement within the limits prescribed will be accomplished before rotary movement occurs.

This braking mechanism comprises a brake shoe 166 (Fig. 8), the upper contact surface of which is faced with brake lining, as indicated at 167, and is forced against the under finished web surface 168 of brake gear 153 by a brake spring 169, the compressive upward thrust of which is regulated by adjustment of a brake screw 170 threaded into the body of the control pedestal or stand 134. It is thus obvious that the frictional resistance to rotation of the gear train provided by this brake mechanism will restrain the premature rotative movement of the gear train, the control hand wheel and the inter-connected mechanism including shaft 159, stem disk 164 and control nut 140, while at the same time permitting rotation of all these parts after the upper and lower limits of axial movement of control piston 141 have been reached and rotation of these parts becomes necessary due to possible continued rotative movement of the screw 133 in response to movement of the needle 123.

Figure 12:
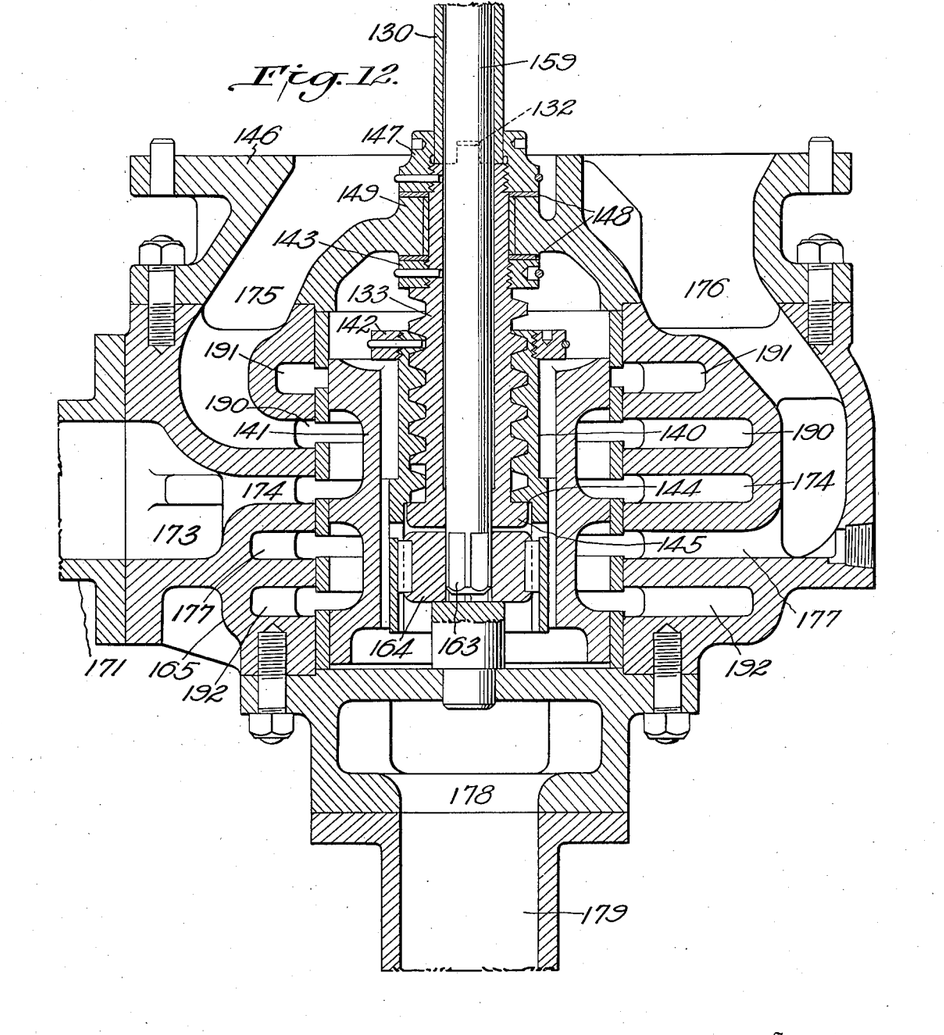
Fig. 12 is a vertical axial section of the control valve of Fig. 7.

The pressure fluid, secured either directly from the pressure conduit behind the needle valve or from any suitable source of supply, is carried to the control valve by a pipe 171 (Figs. 7 and 12) controlled by a gate valve 172, and enters the control valve body 165 through a passage 173. No speed control valve similar to the valve 35 of Fig. 5, or connecting operating equipment therefor is provided or necessary in this modified type of control, but by means of throttling the gate valve 172 in the pressure supply line, the same result is attained. In Fig. 12 the control piston 141 is shown in proper position to admit pressure through passages 174 and 175 to chamber B of the needle valve, and to exhaust chambers A and C, through passages 176 and 177 to outlet 178, pipe 179 and drain header 180, thereby producing opening movement of the needle 123 or maintaining the needle in the wide open position.

While the method of introducing fluid to and removing it from chamber B of the needle valve 123 by means of tubes 40 as previously described herein can be used with this construction, it is preferred to establish communication with chamber B through ports 181 in the walls of the axial tube 182 (Figs. 7, 9, 10 and 11). This tube 182 communicates by way of chamber D and cored passage 183 with the inlet and outlet passages 174 and 178, respectively, of the body of the control valve.

Figure 9:
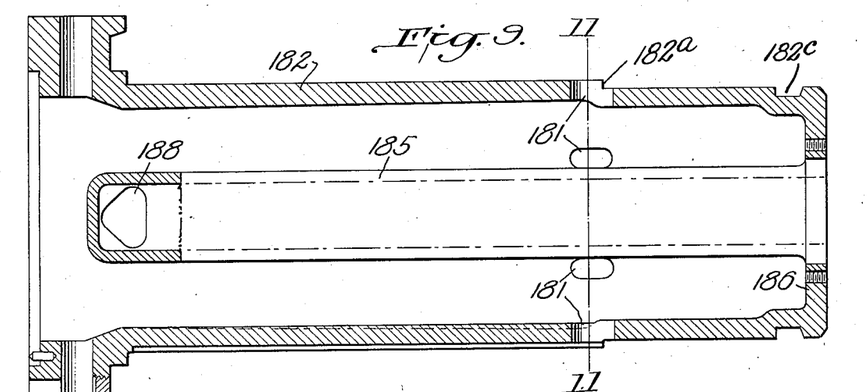
Fig. 9 is a greatly enlarged axial section of the axial tube of the valve proper of Fig. 7.

Chamber A is in direct communication with the body of the control valve through the cored passage 184. Chamber C is placed in communication with chamber A by way of the twin cored passages 185 in tube 182 (Figs. 7, 9, 10 and 11). These two passages open through the end 186 of the tube 182 into chamber C, as indicated at 187 (Fig. 10) and open into chamber A through lateral ports 188 (Figs. 7 and 9). The general form of this diaphragm tube is substantially like that shown in Fig. 1, and includes a radial flange to be bolted to an internal web of the valve casing and a reduced diameter portion for receiving the diaphragm. The radial shoulder 182ª forms a seat against which the diaphragm is forced when a two-part ring 182ᵇ is clamped in the circumferential groove 182ᶜ adjacent the closed end 186 of the diaphragm tube. It will be noted that the inner shoulder of this groove is radial while the outer shoulder is inclined inwardly to force the diaphragm against the radial seat as the clamp ring is tightened.

The bearing member 189 of shaft 127 closes off communication between chambers C and D through the central cavity of tube 182 and thereby prevents interchange of fluid between chambers B and C through this tube.

Figure 13:
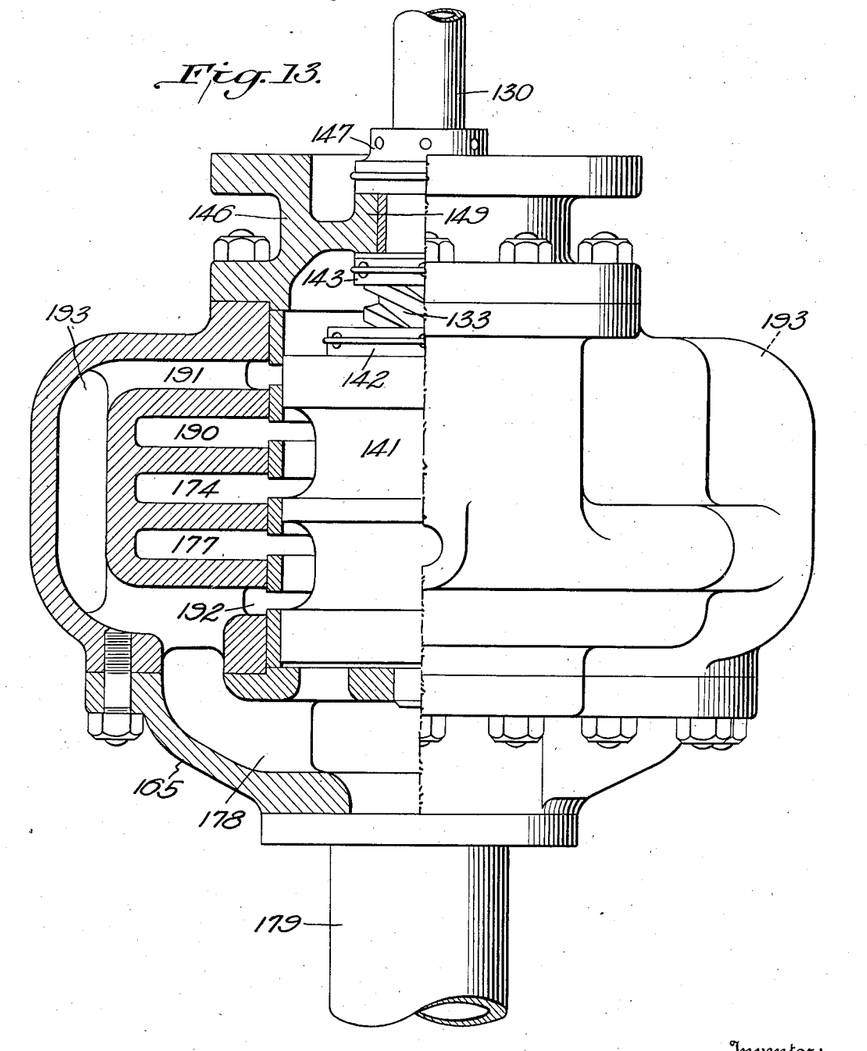
Fig. 13 is a sectional elevation of same taken in a plane at right-angles to the section of Fig. 12.

It will be seen by reference to Figs. 12 and 13 that the annular passage 174 of the control valve body 165 is in communication with the pressure fluid inlet passage 173 and that by change of position of the piston 141 this passage 174 may be made to communicate either with passage 175 or 176 by means of annular passages 190 and 177, respectively. It will also be seen that annular passages 191 and 192 are in open communication with outlet 178 by way of diametrically opposite cored channels 193. Thus, when the piston 141 is in the lowered position shown in Figs. 12 and 13, the inlet passage 173 will be in communication with passage 175 through annular passages 174 and 190, and outlet 178 will be in communication with passage 176 through annular passages 177 and 192.

Conversely, when the piston 141 is raised from the position shown in Figs. 12 and 13, the inlet passage 173 will be in communication with passage 176 through annular passages 174 and 177, and outlet 178 will be in communication with passage 175 through annular passages 190, 191 and 192, by way of channels 193 (see Fig. 13).

With this arrangement of the control and with the intercommunicating passages to the valve chambers A, B, C and D as illustrated, it is apparent that the four fundamental facts which govern the action of this control mechanism are as follows:

1. Upward movement of piston 141 results in closing movement of the needle.
2. Downward movement of piston 141 results in opening movement of the needle.
3. Closing movement of the needle results in downward movement of piston 141.
4. Opening movement of needle results in upward movement of piston 141.

Venting and draining of the cavities of the needle valve are accomplished in the same manner and by the same means as those used and described in regard to the control arranged above the valve proper.

From the foregoing, it will be seen that I provide two relatively simple and very efficient control mechanisms for valves of the type disclosed, whereby the relative or differential pressures in the several chambers which govern movement of the valve needle may be so controlled as to obtain the maximum of efficiency in the operation of the valve.

Moreover, it is to be noted that, due to the sensitiveness of the control valve inherent in the rapid movement of the spool or piston thereof caused by the steep pitch of the multiple thread worm member, the relative pressures in the chambers A and C and chamber B may be quickly controlled in response to relatively slight movement of the needle toward or away from its seat. This also admits of much greater rapidity of acceleration or deceleration of the needle movement and opens the field of utility of valves of this character to include installations not heretofore possible. For example, needle valves equipped with the control mechanism of my invention may be installed as synchronous by-pass valves used for pressure relief in conjunction with high head turbines which drive generators having loads subject to rapid fluctuations.

Various changes and modifications are contemplated as within the spirit of the invention and the scope of the following claims.

I claim:

1. In a control mechanism for valves of the plunger type having a pressure chamber to operate the plunger, the combination of a source of pressure fluid for the chamber, a control valve for the pressure fluid for controlling the pressure of the fluid in the chamber, manually operable rotatable means for the control valve, and further rotatable means automatically responsive to movement of the plunger to operate on the control valve.

2. In a control mechanism for valves of the plunger type having differential pressure chambers, the combination of a source of pressure fluid, means to distribute the pressure fluid to and to control the pressures in the pressure chambers, manually operable rotatable means for controlling the distributing means, and further rotatable means automatically responsive to movement of the plunger to operate on the distributing means.

3. A control mechanism for valves of the plunger type having differential pressure chambers, which includes a control valve having a ported body affording communication between a source of pressure fluid and said chambers and a piston axially movable relatively to the ports of said body for controlling pressures of fluid in said chambers, a rotatable member for imparting axial movement to said piston, means responsive to movement of said plunger for imparting rotation to said rotatable member whereby said piston may be adjusted in response to movement of the plunger, and manually operable means for varying the position of said piston whereby movement of said plunger may be controlled in response to variation of pressures in said chambers.

4. The combination with a valve having a casing and a plunger axially movable thereof for controlling flow of fluid therethrough, said casing and plunger providing a plurality of differential pressure chambers for the reception of a pressure fluid whereby motion is imparted to said plunger, of control mechanism therefor, including a control valve having a ported body affording communication between a source of pressure fluid and said chambers and an axially movable piston for controlling said communication, means including a nut carried by said piston and a rotatable worm member in mesh therewith for imparting axial movement to said piston, and means actuated in response to axial movement of said plunger for imparting rotation to said worm member, whereby movement of said plunger effects movement of said piston to vary the pressure effect in said chambers.

5. The combination with a valve having a casing and a plunger axially movable thereof for controlling the flow of fluid therethrough, said casing and plunger providing a plurality of differential pressure chambers for the reception of a pressure fluid whereby motion is imparted to said plunger, of control mechanism therefor, including a control valve having a ported body affording communication between a source of pressure fluid and said chambers and an axially movable piston for controlling such communication, means including a nut carried by said piston and a rotatable worm member in mesh therewith for imparting axial movement to said piston, means including a rack-and-pinion gearing operable in response to movement of said plunger for rotating said worm member and thereby moving said piston to vary the pressure effect in said chambers, and manually operable means for adjusting said piston whereby the effect thereon of movement of said plunger may be varied and the pressure effect in said chambers altered to alter the position of said plunger.

6. The combination with a valve having a casing and a plunger axially movable thereof for controlling the flow of fluid therethrough, said casing and plunger provided with a plurality of differential pressure chambers, of a control mechanism, including a control valve having a ported body affording communication between a source of pressure fluid and said chambers, a piston for controlling the ports of said body whereby to vary the pressures effective in said chambers, a nut carried by said piston, a rack carried by said plunger, a shaft carrying a worm member in mesh with said nut and a pinion in mesh with said rack, whereby movement of said plunger will vary the position of said piston relatively to the ports of said body, and means for manually rotating said nut relatively to said worm whereby the effect of movement of said plunger upon said piston may be modified.

7. The combination with a valve having a casing and a plunger movable axially thereof for controlling the flow of fluid therethrough, said casing and plunger providing a plurality of differential pressure chambers, of control mechanism therefor including a control valve, means defining passages affording communication between said control valve and said chambers and including a communication tube fixed in said casing, said plunger being movable relatively to said tube, and a fluid-tight flexible bearing interposed between said plunger and tube.

8. The combination with a valve having a casing and a plunger movable axially thereof for controlling the flow of fluid therethrough, said casing and plunger providing a plurality of differential pressure chambers, of control mechanism therefor including a control valve, means defining passages affording communication between said control valve and said chambers and including a ported communication tube fixed in said casing, said plunger being movable relatively to said tube, and a fluid-tight flexible bearing including a bearing sleeve interposed between said plunger and tube, and arranged for movement with said plunger axially of said tube, said sleeve cooperating with the port of said tube to throttle flow of fluid therethrough.

9. The combination with a valve having a casing and a plunger movable axially thereof for controlling the flow of fluid therethrough, said casing and plunger providing a plurality of differential pressure chambers, of control mechanism for controlling the pressures in said chambers by controlling the admission and escape of pressure fluid therefrom, and valve controlled means including registering ports and passages in said plunger and casing respectively for exhausting air from said casing and chambers in the presence of pressure fluid therein.

10. The combination with a valve having a casing and a plunger movable axially thereof for controlling the flow of fluid therethrough, said casing and plunger providing a plurality of differential pressure chambers, of control mechanism for said valve including a control valve for controlling the admission to and exhaust of pressure fluid from said chambers, means for exhausting air from said casing and chambers and from said control valve, and means for draining water from said casing, chambers and control valve, said means including ports in said plunger which, upon closing of the plunger, move into alignment with corresponding ports in said casing.

11. The combination with a valve having a casing and a plunger movable axially thereof for controlling the flow of fluid therethrough, said casing and plunger providing a plurality of differential pressure chambers, of control mechanism for said valve including a control valve for controlling the admission to and exhaust of pressure fluid from said chambers, means for exhausting air from said casing and chambers and from said control valve, and means for draining water from said casing chambers and control valve, the draining means for said chambers including passages in said casing and ports in said plunger, said passages and ports adapted to register when said valve is closed.

12. In a control mechanism for plunger valves, a control valve including a ported body and a piston for controlling the ports thereof, and means for imparting axial movement to said piston including a nut carried by said piston and fixed axially thereof but rotative therein under certain conditions, a worm member in mesh with said nut, stops for limiting axial movement of said nut and hence of said piston, means for rotating said worm member relatively to said nut to thereby move said piston axially, said means capable of imparting axial movement to said piston in excess of that permitted by said stops, said excess axial movement being transformed into rotary movement by rotation of said nut with said worm member within said piston.

13. In a control mechanism for plunger valves, a control valve including a ported body and a piston for controlling the ports thereof, means for imparting axial movement to said piston including a nut carried by said piston and fixed axially thereof but rotative therein under certain conditions, a worm member in mesh with said nut, means for rotating said worm member and thereby imparting axial movement to said nut and piston, and means for rotating said nut relatively to said worm member.

14. In a control mechanism for valves of the needle type, the construction with a valve body, a needle slidable therein, and means cooperating with said needle to define a plurality of pressure fluid chambers, of a casing open to a source of pressure fluid, and movable means to distribute the pressure fluid to and to control the pressures in the pressure chambers, said means comprising a reciprocating valve, intermeshed worm and nut elements, means securing one of said elements to said reciprocating valve to prevent axial displacement thereof and frictionally to resist relative angular displacement, manual means for rotating one of said elements, and means for rotating the second element in accordance with the displacement of said needle.

15. The combination with a valve casing, a needle, and means cooperating with said needle to define a plurality of chambers for receiving pressure fluid for actuating said needle, of a member for controlling the supply of pressure fluid to and the exhaust thereof from the respective chambers, a pair of rotatable elements having meshing threads of such pitch that rotation of but one element effects a relative axial displacement of the elements, means connecting one element to said member for actuating the same, and manually actuated means for rotating one of said elements, and means for rotating said second element in response to movement of said needle; each of said rotating means, when inactive, normally preventing rotation of the element associated therewith when the other element is rotated by its rotating means.

16. The invention as claimed in claim 15, wherein rotation of but one element effects a sliding movement of said controlling member, in combination with stop means restricting the sliding displacement of said controlling member to a fraction of the total distance corresponding to actuation by said second element in response to a full stroke of said needle, and wherein said means connecting one element to said member includes a frictional connection yieldable under abnormal conditions to permit the simultaneous rotation of both elements in the event that the rotation of said second element by said needle continues after sliding movement of said controlling member is arrested by said stop means.

17. The invention as claimed in claim 15, in combination with an adjustable brake cooperating with said manually actuated means to normally prevent, except when said manually actuated means is purposely actuated, rotation of the element associated therewith.

18. In a control mechanism for use with needle valves of the multiple-chamber type, the combination of a casing providing a pressure fluid inlet opening and an exhaust fluid outlet opening, passages adapted to communicate with the respective chambers of a needle valve, a reciprocating piston for controlling communication between said passages and said openings, a worm element and a cooperating nut element for actuating said piston, manual control means for rotating one of said elements, automatic control means adapted to be connected to the needle of said valve for rotating said other element in accordance with the movement of the needle, and means connecting one of said elements to said piston substantially to prevent relative axial displacement of the said connected element and said piston; each of said elements normally acting as a substantially non-rotating body except when rotated by its own control means, whereby said piston may be given a reciprocating movement by a rotation of either of said elements.

19. A control mechanism as claimed in claim 18, wherein said automatic control means rotates the element associated therewith in such sense that movement of the needle in response to a manual displacement of said piston rotates the needle-associated element to restore said piston to its former position.

20. In a needle valve, the combination with a needle valve casing, an inner shell within said casing and cooperating therewith to define an annular fluid conduit, a needle slidable in said shell, means cooperating with said needle to provide a plurality of pressure chambers, and means defining passages in said casing and extending to the respective chambers, of a control valve casing secured to said needle valve casing and having passages therein opening into the passages of said needle valve casing, a pressure fluid inlet and an exhaust fluid outlet for said control valve casing, a control valve within said casing, manually operable means and a mechanical drive connecting the same to said control valve, and means completely enclosed within said casings for automatically actuating said control valve in response to movement of said needle.

21. A needle valve as set forth in claim 20, wherein said needle valve casing is arranged with the axis of the said fluid conduit substantially coinciding with a horizontal line, and the said control valve casing is arranged at the top of said needle valve casing.

22. A needle valve as set forth in claim 20, wherein said needle valve casing is arranged with the axis of the said fluid conduit substantially coinciding with a horizontal line, and the said control valve casing is arranged at the bottom of said needle valve casing.

23. A needle valve as claimed in claim 20, wherein said mechanical drive includes a chain of gears, in combination with a casing housing said mechanical drive and secured to said control valve casing.

24. A needle valve as claimed in claim 20, in combination with a control stand supporting said manually operable means, an indicator carried by said control stand, and means connecting said indicator to said needle for actuation thereby, said connecting means and mechanical drive each including one element of a pair of telescoped elements extending into said control stand.

25. In a needle valve of the type including a casing, a needle having an annular head and a detachable nose, and a diaphragm within the needle; a diaphragm tube having one flanged end adapted to be secured to the casing, the opposite end of said tube having a reduced diameter end portion terminating in an inner radial shoulder, and a circumferential groove adjacent the outer end of said reduced diameter portion, whereby a diaphragm fitted upon said reduced diameter portion may be clamped against said radial shoulder by a clamp ring seated in said groove.

26. A diaphragm tube as claimed in claim 25, wherein the said groove has an inner radial wall substantially normal to the axis of said tube, and an outer wall which flares outwardly from said inner radial wall.

27. In a valve, the combination with a casing, an inner shell, a needle slidable in said shell and having an annular head, and a diaphragm within said needle, of a tube securing said diaphragm to said shell, said annular head cooperating with said diaphragm to form two transverse walls which divide the space within said needle and shell into three tandem compartments, a cored passage within said tube and opening into the compartment at the nose of the needle, ports in the wall of said tube to place the bore thereof in communication with the compartment formed between said annular head and said diaphragm, a port in the wall of the tube which forms a part of said cored passage, said last port being arranged rearwardly of the extreme rear position of the annular head when the needle is fully open, whereby the end compartments are in free communication through said cored passage, and wall means within said shell defining a fluid passage communicating with the bore of said tube.

28. In a valve, the combination with a casing, an inner shell, a needle slidable in said shell and having an annular head, and a diaphragm within said needle, of a tube securing said diaphragm to said shell, said annular head cooperating with said diaphragm to form two transverse walls which divide the space within said needle and shell into three tandem compartments, and a pressure fluid tube secured to said diaphragm and having a sliding and water-tight fit in said annular head, an end wall closing said pressure fluid tube to the compartment at the nose of said needle, lateral ports in the wall of said pressure fluid tube and opening into the compartment between said head and diaphragm, and means defining a fluid passage opening into the bore of said pressure fluid tube.

29. A valve as claimed in claim 28, wherein said passage defining means comprises partition walls in said shell, one of said partition walls having an opening into which the end of said pressure fluid tube extends.

30. In a system for controlling fluid flow in a conduit, a valve element in the conduit in combination with energizable means whereby the same is moved, an energy distributor for the said means, a manual operator for the distributor, a valve element operator therefor, and an interposed mechanical compensator having a differential function whereby the valve element is positioned in response to a cooperative action of the operators.

31. In a system for controlling fluid flow in a conduit, a valve element in the conduit in combination with pressure chambers whereby the same is moved, a pressure distributor for the chambers, a manual operator for the pressure distributor, a valve element operator therefor, and an interposed mechanical compensator having a differential function whereby the valve element is positioned in response to a cooperative action of the operators.

32. In a system for controlling fluid flow in a conduit, a valve element in the conduit in combination with pressure chambers whereby the same is moved, a pressure distributor for the chambers, a plurality of operators therefor at least one of which is positioned from a change in position of the valve element, and an interposed mechanical compensator having a differential function allowing the valve element to readjust the distributor from an original overtravel motion of the valve element originating from pressure energization through either one of the aforesaid operators unaffected by change in position of the valve element.

33. In a system for controlling fluid flow in a conduit, a valve element in the conduit in combination with energizable means whereby the same is moved, an energy distributor for the said means, a manual operator for the distributor, a valve element operator therefor, an interposed mechanical compensator having a differential function whereby the valve element is positioned in response to a cooperative action of the operators, and an over-travel protection means between at least one of the operators and the said mechanical compensator.

PHILLIP A. KINZIE.